June 2, 1936.  J. D. STULTZ  2,042,563
BRAKING DEVICE
Filed May 14, 1934    5 Sheets-Sheet 1

Inventor:
James D. Stultz
By Arthur J. Robert
Attorney

June 2, 1936. J. D. STULTZ 2,042,563
BRAKING DEVICE
Filed May 14, 1934 5 Sheets-Sheet 2
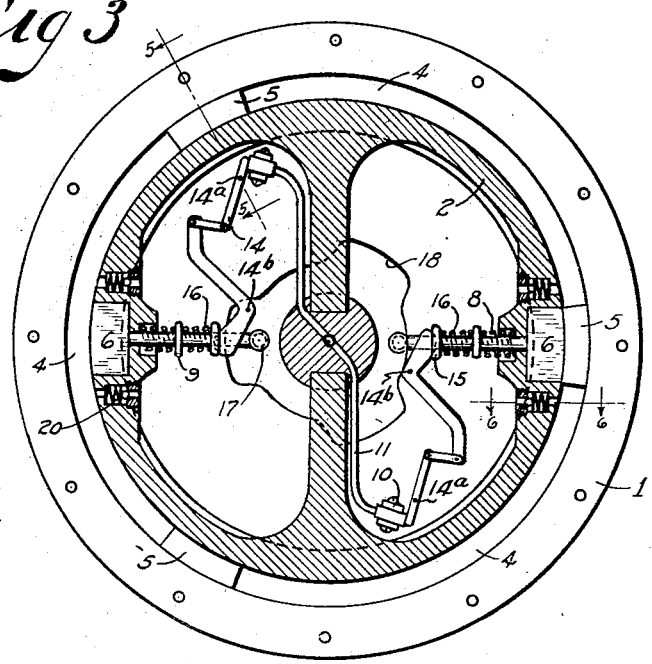
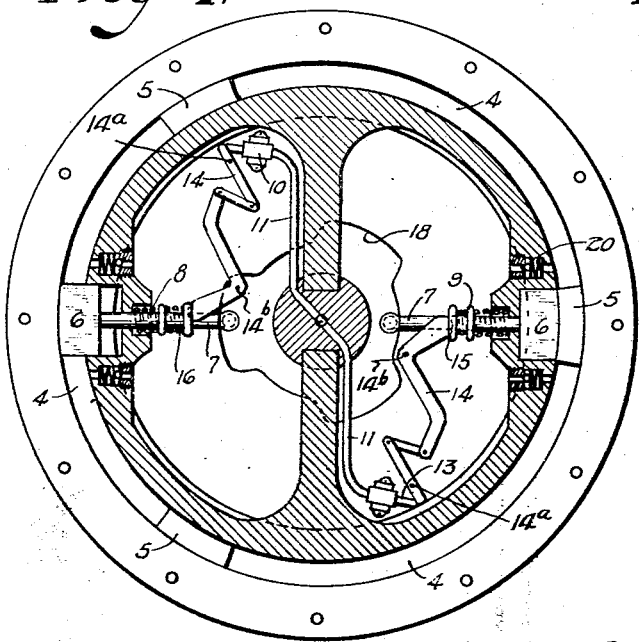
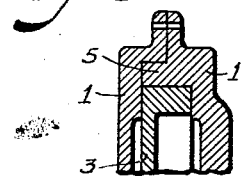
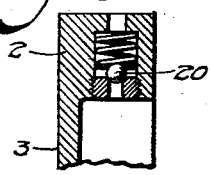
Inventor:
James D. Stultz
By Arthur J. Robert
Attorney

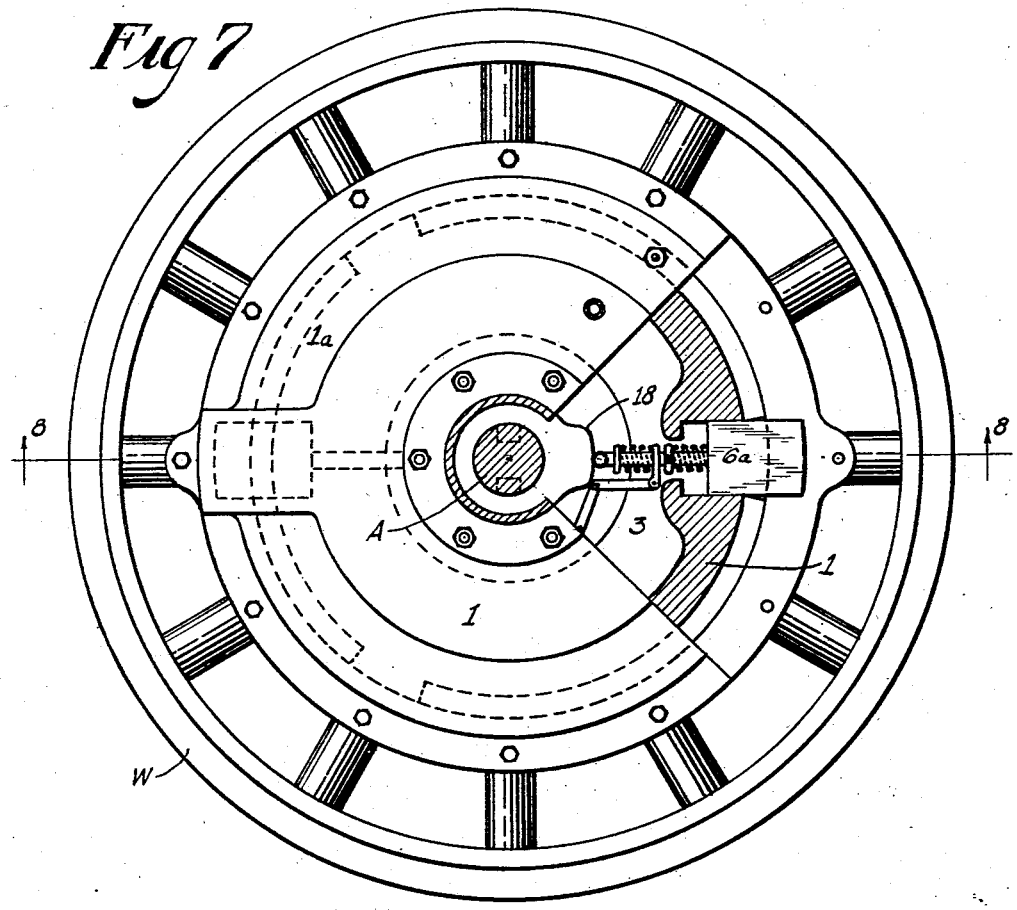
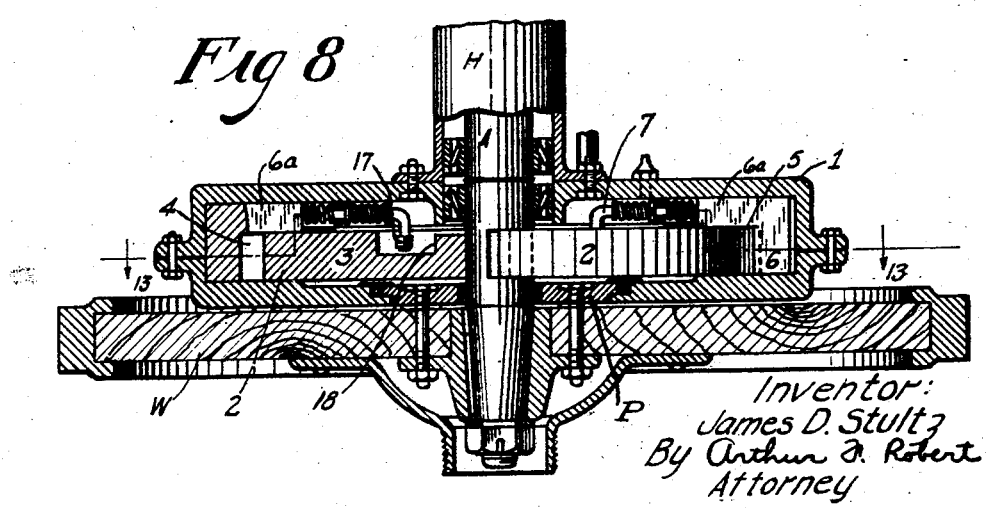

June 2, 1936.  J. D. STULTZ  2,042,563
BRAKING DEVICE
Filed May 14, 1934  5 Sheets-Sheet 4
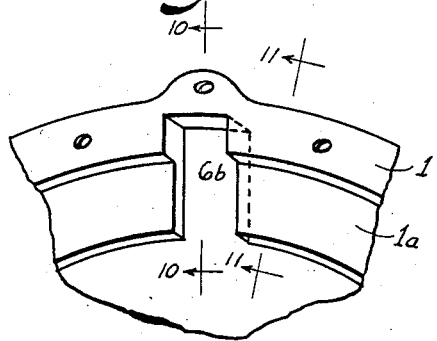
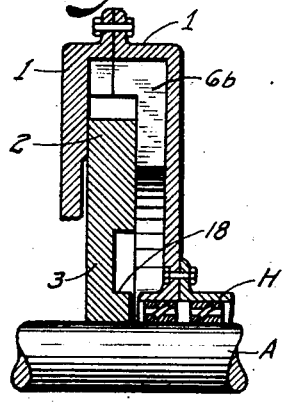
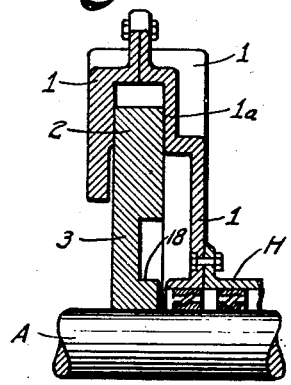
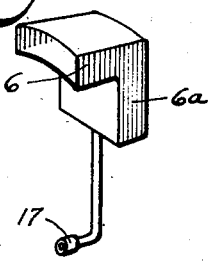
Inventor:
James D Stultz
By Arthur J. Robert
Attorney Inventor:
James D. Stultz
By Arthur J. Robert
Attorney Patented June 2, 1936

2,042,563

UNITED STATES PATENT OFFICE 2,042,563

BRAKING DEVICE

James D. Stultz, Shively, Ky., assignor to Ida I. Garr, Shively, Ky., and himself Application May 14, 1934, Serial No. 725,415

7 Claims. (Cl. 188—90)

This invention relates to a braking device which is particularly intended for, but not at all limited to, use on wheeled structures such as automobiles.

The principal object of the invention is to provide a novel type of brake wherein a liquid is utilized to build up the retarding or braking force between a stationary structure and a rotating structure.

Another object is to provide a compact braking device in which the braking parts are enclosed within a liquid tight casing and operated in a lubricating bath and in which the same lubricating material is utilized to build up the braking force.

A further object is to provide a device in which the brakes can be quickly applied to produce any desired braking force ranging up to a point at which the rotating structure is locked against rotation.

Generally stated, the invention consists in arranging a rotating structure and a stationary structure so that they cooperate to define a liquid chamber and providing a braking member for projection into and retraction from the liquid chamber, the braking member and chamber being arranged relatively to each other in a manner such that one rotates with the rotary structure while the other is positioned on the stationary structure along the path of rotation whereby when the braking member is projected during rotation, a braking presure will be built up in the liquid between the braking member and the end wall of the chamber which retards further rotation. For example, with an arrangement wherein the liquid chamber rotates with the rotating structure, the braking member is mounted on the stationary structure and, during the braking action, is projected into the chamber where it restricts the rotary movement of the liquid contained in the chamber between it and the approaching end wall of the chamber and thereby builds up a braking force. The braking member is designed to extend throughout the cross-section of the chamber when completely projected and consequently, in such position, limits further movement to the degree of compression which the liquid will permit. Where the braking member is not fully projected, further movement will be limited by the pressure built up between the braking members and end wall, this pressure being largely determined by the rate at which the liquid passes around the end of the braking member. In this latter case, movement may continue beyond the point at which the braking member and end wall would meet. Hence, the invention contemplates the provision of means for automatically retracting the braking member before this point is reached and for automatically projecting it into the next section after the point is passed.

The invention is illustrated in the accompanying drawings, wherein:—

Figure 1:
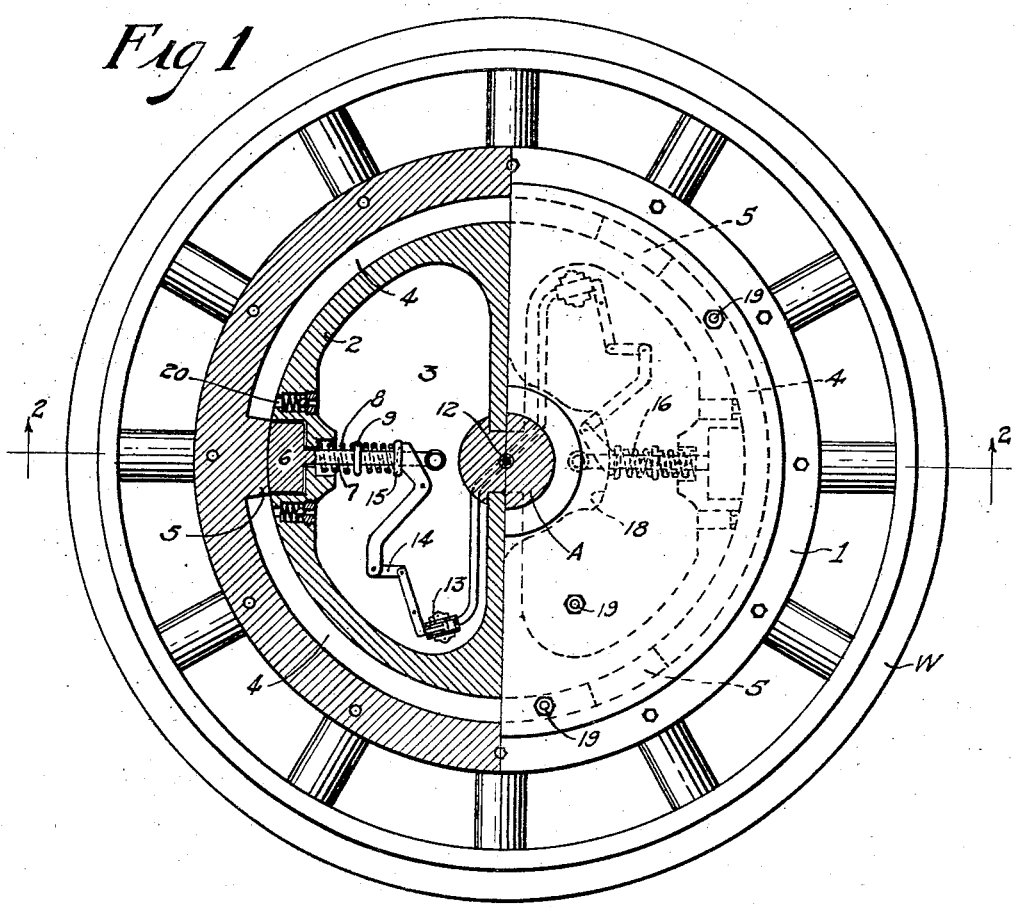
Figure 1 is a side elevation of one embodiment of my invention, with one part in section, the entire view corresponding to one taken along lines 1—1 of Figure 2.
Figure 2:
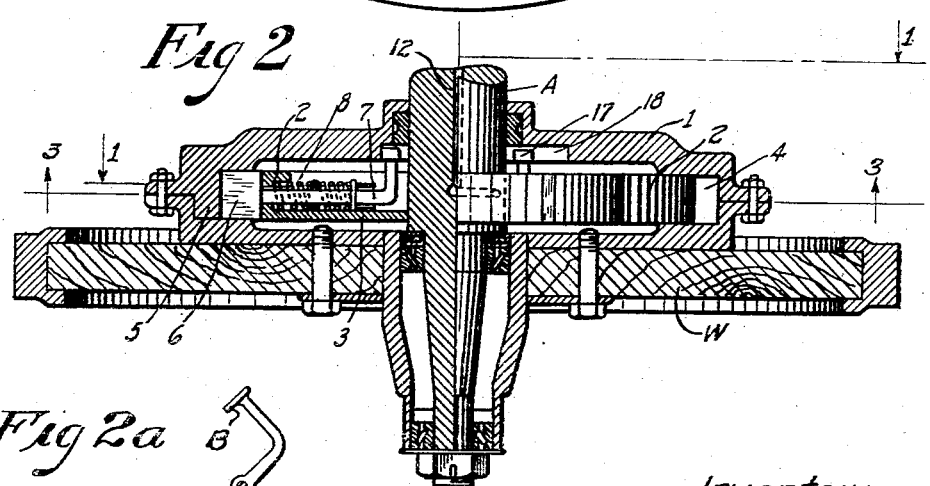
Figure 2 is a section taken along line 2—2 of Figure 1 with one part shown in elevation.
Figure 2A:
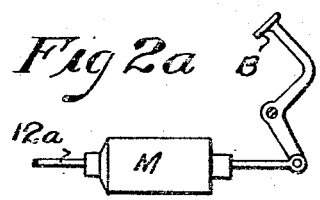

Figure 2—a is a schematic view of the brake operating master cylinder and pedal;

Figure 3 is a sectional view taken along line 3—3 showing the brakes released;

Figure 4 is a view similar to that shown in Figure 3 but showing the brakes applied;

Figures 5 and 6 are detail sections taken along lines 5—5 and 6—6 of Figure 3;

Figure 7 is a side elevation of another embodiment of my invention with a segment of the casing cut away to show the braking member, the section lines indicating a part of the casing;

Figure 8 is a section 8—8 of Figure 7;

Figure 9 is a perspective view of that portion of the casing which contains a recess for receiving a braking member;

Figures 10 and 11 are sections taken along lines 10—10 and 11—11 respectively of Figure 9;

Figure 12 is a perspective view of a braking member; and

Figure 13:
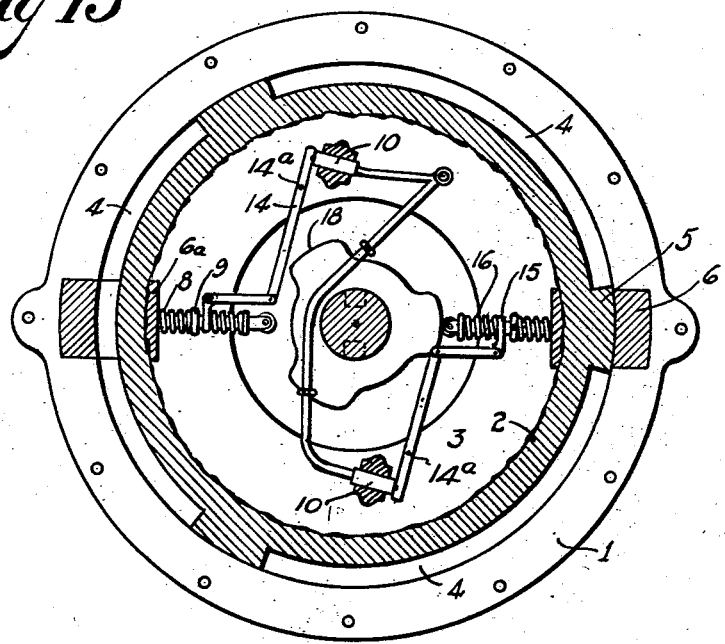

Figure 13 is a sectional view taken along lines 13—13 of Figure 8 showing the brakes released.

Figure 14:
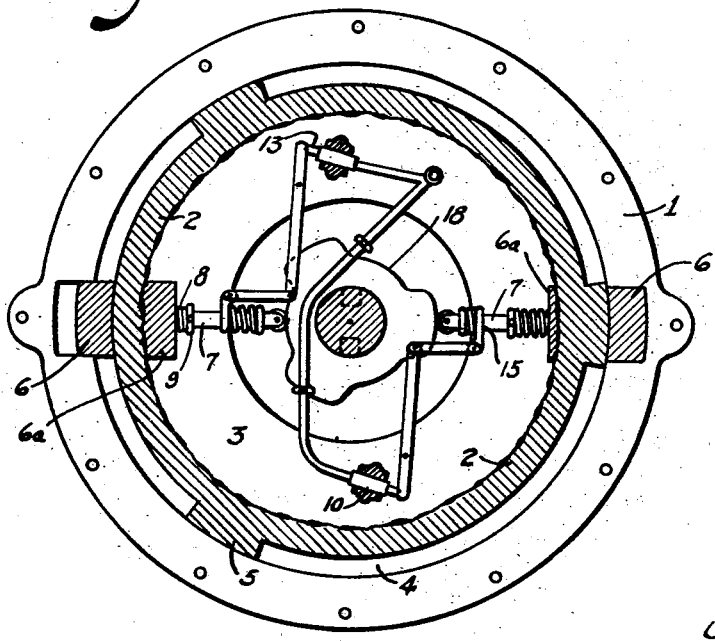

Figure 14 is a view similar to that of Figure 13 but showing the brakes applied.

The invention is shown in Figures 1 to 4 as applied to wheel W which is mounted on a stationary shaft or axle A such as the front wheel axle of the conventional automobile. The braking mechanism is contained within a vertically split casing 1 which is rotatably mounted around the axle A and bolted or otherwise suitably secured to the inner face of the wheel W so as to rotate therewith. The interior of the casing 1 is concentrically divided into inner and outer sections by a stationary annular member or rim 2, the periphery of which is suitably spaced from the inner periphery of the casing and the side walls of which fit against the adjacent walls of the casing at a suitable distance from the axle A. The rim 2 is fixedly mounted on the axle A through the agency of a disc 3 which extends from the axle outwardly to one side of the rim, the rim and disc preferably being integral. The outer section is divided into one or more chambers 4 by piston or end wall members which rotate with the casing 1 and are, therefore, secured to or made integral with one part of it. Only one chamber 4 is necessary but in the embodiment illustrated, three chambers 4 separated by three equally spaced end walls 5 are shown.

The braking action is produced by providing the chambers 4 with a suitable liquid, such as a mixture of castor oil and glycerine, and projecting into the chambers a braking member which more or less traps the liquid between it and the approaching end wall 5. Accordingly, the rim 2 is fashioned with a suitable number of equally spaced recesses corresponding to the number of braking members to be employed. The construction shown contains two such recesses which are diametrically opposed. In each recess an outwardly movable braking member 6 is mounted. Each member 6 is centered in its movement by the walls of the recess in which it is located and by a rod 7 which extends from such member through an opening in the rim 2 inwardly into the inner section of the casing 1. Each member also is urged toward and normally held in the "off" position by a spring 8 which is arranged around the rod 7 between the rim and a collar 9 on the rod 7.

Any suitable means may be provided to move the braking members 6 into the "on" position. I prefer to effect such movement through separate fluid cylinders 10 contained within the inner compartment of the casing and connected by separate conduits 11 to a common conduit 12 in the axle A, the conduit 12 being connected through conduit 12a to a master cylinder M which contains a suitable liquid and which is controlled by a brake pedal B or the like. The master cylinder and brake pedal which may be of any suitable type, are arranged so that when the pedal is depressed, the master cylinder is operated to place the fluid or liquid in the cylinders 10 under pressure and thereby move the operating pistons 13 in the cylinders 10 in one direction, this movement being reversed when the pedal is released. The movement of each of the pistons 13 is transmitted through levers 14, fulcrumed at 14a and 14b respectively, to a loose collar 15 on the rod 7 of its respective member 6, the collar 15 acting through spring 16 and the fixed collar 9 to move the braking member 6, against the action of spring 8.

Obviously, this arrangement permits the braking member 6 to be fully or partly projected into the chamber 4. When fully projected, it traps all of the liquid between it and the approaching end wall 5, thereby causing a pressure to be built up rapidly and continuously to the point where the rotating structure is locked against further rotation. When the member 6 is only partly projected, the rotary movement of the liquid in the chamber is restricted by the braking member 6 and a pressure thereby built up, this pressure being limited by the size of the opening extending between the member 6 and the inner periphery of the casing. Obviously, the pressure which is built up will retard the rotating structure, causing it to decelerate. Inasmuch as such decelerating motion will, in most instances, continue far beyond the point at which the member 6 and end wall 5 pass each other, it is necessary to retract the member 6 at such points. Accordingly, the inner end of rod 7 is laterally bent toward the casing 1 and provided with a roller 17 which extends within the area embraced by a cam surface 18 on the casing 1. The cam surface 18 is shaped to permit the full projection of the member 6 into the chambers 4. However, as soon as the end wall 5 comes within a predetermined distance of the member 6, the cam 18 engages the roller 17 and completely retracts the member 6 from chamber 4. It may be noted that the position of the brake operating levers 14 is more or less fixed while the brakes are in the "on" position and consequently such levers oppose the retraction of the member 6. The spring 16, however, is designed for compression to the degree necessary to make full retraction possible. When the member 6 is released by the cam, the spring 16 functions to return the member 6 to the "on" position.

The operation of the brakes will, no doubt, be more readily understood by comparing Figures 3 and 4. In Figure 3, the operating pistons 13 are both in the "off" position and their respective braking members 6 are fully contained within the recesses of the rim 2. In Figure 4, the operating pistons 13 are both projected to the "on" position, but only one braking member 6 (the member at the left) is projected into a chamber 4. The other braking member being opposite an end wall 5 is shown in the retracted position with its roller 17 in engagement with the retracting portion of the cam 18. If the brakes are only partially projected so that rotation continues from this position, it will be evident that the braking member at the right will be released by the cam and projected into the next chamber 4 while the braking member at the left will be engaged and retracted by the cam to permit the approching end wall 5 to pass.

It will be understood that the inner and outer sections of casing 1 are provided with the same liquid so that all parts are kept lubricated. The casing 1 is provided with suitable connections 19 for introducing this liquid into the various chambers and the inner section. In order to prevent it from escaping, the connections between the rotatable casing and the stationary axle A are tightly sealed or packed in any suitable manner. Furthermore, the stationary rim 2 is fitted as tightly as is practical against the rotatable sides of the casing 1. Naturally, under the pressures developed in the chambers 4, some of this liquid may be forced from these chambers into the inner section. To compensate for this loss, the rim 2 is provided at both sides of each braking member 6 with a check valve 20 permitting the liquid to flow from the inner section to the outer chambers but preventing a reverse flow.

In the alternative construction illustrated in Figures 7 to 14 inclusive, the invention is shown as applied to a wheel W which is mounted on a rotating axle A such as the rear wheel or driving axle of the conventional type of automobile. The split casing 1 in this embodiment is stationary and, to that end, is fixedly secured, on one side, to the stationary axle housing H and, on the other side is connected, in any suitable leak-tight manner, to a rotatable circular plate P which is centrally fixed on the wheel. This casing is divided into inner and outer sections by a rim 2 which is rotatably mounted directly on the axle by means of the disc 3. The outer section is divided into three chambers 4 by three end walls 5 which are equally spaced along and mounted on the rim 3.

The braking action is accomplished in the same manner as before. However, in this case, the braking members 6 are arranged along the outer edge of the outer section for the accommodation of the members 6 which move radially inward during the braking action. In order to actuate the members 6, they are, as indicated at 6a, extended laterally beyond one face of the rim 2, and inwardly along the rim for a suitable distance, their inner ends being connected to the actuating mechanism. The extension 6a of each braking member is contained within a diametrically opposed recess 6b of the casing 1, each of these recesses being a lateral and inward extension of the recess in which the corresponding braking member 6 is contained. One side wall of each extension 6a provides a side wall for the adjacent part of the outer section. The side wall of that portion of the outer section which extends between the extension 6a is provided by the walls 1a of the casing, these walls being off-set inwardly from the plane of the hub portion of the casing 1. In connection with the braking members, it should be understood that the fit of members 6 in their recesses 6b is such that their movement is substantially unaffected by liquid trapped in said recesses.

The braking members 6 are provided with rods 7 and normally urged outwardly by a spring 8 which is positioned on the rod between the member 6 and a collar 9, the latter being fixed to the casing 1 and fitted loosely around the rod. The braking movement is accomplished through the cylinders 10 whose operating pistons 13 respectively are resiliently connected by levers 14, fulcrumed at 14a loose collar 15, and spring 16 to the rod 7. The inner end of the rod 7 is provided with a roller 17 and bent laterally toward disc 3 so that it extends into an annular recess in the disc 3 where it is in position to be engaged by a cam 18 on the disc. The braking action is, of course, controlled by the brake pedal which, when depressed, causes, in a manner similar to that described in connection with the other type of structure, the inward movement of the members 6 into the section 4 producing the braking action heretofore mentioned. The cams 18 are arranged to push the members outwardly and thus retract them from the path of the pistons 5 at the proper intervals, after which they are returned to the braking position by the spring 16. This construction is provided with the usual oil connection 19 and may, if desired, have the compensating valves 20 as used on the other structure.

Having described my invention, I claim:

1. A braking device comprising a rotary structure, a stationary structure, said structures cooperating to define an outer liquid chamber having an end wall, a braking member mounted on one of said structures for projection into and retraction from said chamber, said braking member and chamber being arranged relatively to each other so that one rotates with the rotary structure while the other is positioned on the stationary structure along the path of rotation, means for projecting said braking member whereby during rotation a braking pressure is built up in the liquid between the braking member and the approaching end wall of the chamber, and means automatically operating during rotation for retracting said braking member when the space between it and the end wall of the chamber is reduced to a predetermined value, said retracting means being spaced inwardly from said liquid chamber.

2. A braking device comprising a rotary structure, a stationary structure cooperating therewith to define an outer liquid chamber, said chamber having an end wall which rotates with said rotary structure, a braking member mounted on said stationary structure along the path of travel of said end wall and arranged for projection into and retraction from an adjacent chamber, said member when projected during rotation being adapted to restrict the rotary movement of the liquid contained in the chamber between it and the approaching end wall and thereby build up a braking force, and means automatically operative for retracting said braking member when the approaching end wall reaches a predetermined point in advance of said member, said retracting means being spaced inwardly from said liquid chamber.

3. A braking device comprising a rotary structure, a stationary structure cooperating therewith to define an annular series of at least three liquid chambers, each having an end wall which rotates with the rotary structure, a series composed of at least two braking members mounted on the stationary structure at substantially equally spaced points along the path of travel of said end walls, each member being normally retracted from an adjacent chamber but arranged for projection thereinto wherein during rotation it functions to restrict the rotary movement of the liquid contained in the chamber between it and the approaching end wall and thereby build up a braking force, means for projecting said members respectively into adjacent chambers, and means automatically operative during rotation for retracting each projected member from its chamber when the space between it and the approaching end wall of that chamber is reduced to a predetermined value, said retracting means being spaced inwardly from said chambers and arranged to permit the return of said member to a projected position in the next chamber after the end wall passes over the member.

4. A braking device comprising a rotatable casing, a stationary rim mounted within said casing and cooperating therewith to divide the interior of the casing into separate inner and outer liquid sections, said rim having a recess which opens into the outer section, an end wall dividing the outer section into at least one chamber, said wall being rotatable with the casing, a braking member normally contained within said recess but adapted for projection into said chamber wherein during rotation it functions to restrict the rotary movement of the liquid contained in the chamber between it and the approaching end wall and thereby build up a braking force, and means for projecting said member.

5. A braking device comprising a rotatable casing, a stationary rim mounted within said casing and cooperating therewith to divide the interior of the casing into separate inner and outer liquid sections, said rim having a recess which opens into the outer section, an end wall dividing the outer section into at least one chamber, said wall being rotatable with the casing, a braking member normally contained within said recess but adapted for projection into said chamber wherein during rotation it functions to restrict the rotary movement of the liquid contained in the chamber between it and the approaching end wall and thereby build up a braking force, means for projecting said member, and means automatically operative during rotation for retracting said member when the end wall approaches to a predetermined distance of said member, said means permitting the projection of the member after the end wall passes over it.

6. A braking device comprising a rotatable casing, a stationary rim mounted within said casing and cooperating therewith to divide the interior of the casing into inner and outer liquid sections, said rim having a recess which opens into the outer section, an end wall dividing the outer section into at least one chamber, said wall being rotatable with the casing, a braking member normally contained within said recess but adapted for projection into said chamber wherein during rotation it functions to restrict the rotary movement of the liquid contained in the chamber between it and the approaching end wall and thereby build up a braking force, means for projecting said member, and a cam rotatably mounted on the casing and arranged to retract the braking member when the end wall approaches to a predetermined distance of said member, said cam permitting the projection of the member after the end wall passes over it.

7. A braking device comprising a rotatable casing, a stationary rim mounted within said casing and cooperating therewith to divide the interior of the casing into inner and outer sections, each of which is adapted to receive and hold a lubricating material, said rim having a recess which opens into the outer section, an end wall dividing the outer section into at least one chamber, said wall being rotatable with the casing, a braking member normally contained within said recess but adapted for projection into said chamber wherein during rotation it functions to restrict the rotary movement of the liquid contained in the chamber between it and the approaching end wall and thereby build up a braking force, and means for projecting said member, and a check valve in said rim permitting a flow of said lubricating material from the inner compartment to the outer.

JAMES D. STULTZ.